INVENTOR
CHARLES D. BRANSON

INVENTOR
CHARLES D. BRANSON

BY Candor & Candor

HIS ATTORNEYS

Jan. 26, 1971    C. D. BRANSON    3,558,250
FUEL CONTROL SYSTEM FOR A COOKING APPARATUS OR THE LIKE
Filed Dec. 10, 1968    10 Sheets-Sheet 7

INVENTOR
CHARLES D. BRANSON
BY
HIS ATTORNEYS

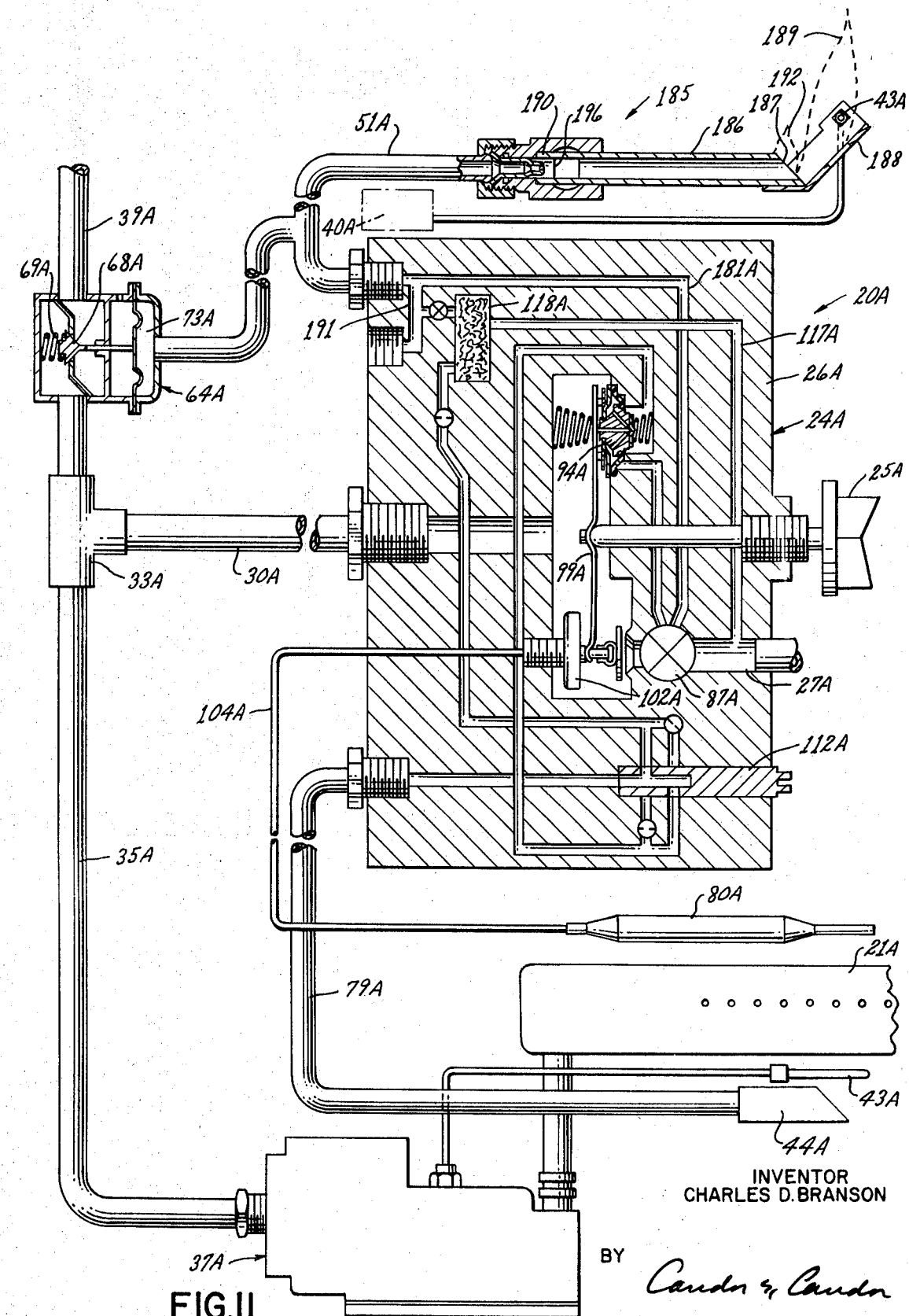

United States Patent Office 3,558,250
Patented Jan. 26, 1971

3,558,250
FUEL CONTROL SYSTEM FOR A COOKING APPARATUS OR THE LIKE
Charles D. Branson, Greensburg, Pa., assignor to Robertshaw Controls Company, Richmond, Va., a corporation of Delaware
Filed Dec. 10, 1968, Ser. No. 782,531
Int. Cl. F23q 9/08
U.S. Cl. 431—61                        17 Claims

ABSTRACT OF THE DISCLOSURE

This disclosure relates to a control system for a bake burner and a broil burner of a domestic oven or the like wherein a control device is adapted to interconnect a source of fuel to a conduit means leading to the bake burner and the broil burner, the conduit means having fluid pressure operated valve means therein intermediate the control device and at least one of the burners with the valve means being so constructed and arranged that the same will direct the fuel issuing thereto from the control device to that one burner only when the selector means of the control device is set for operation of that one burner.

---

This invention relates to an improved fuel control system that can be utilized for a double-burner oven arrangement but need not be limited to such an arrangement.

While control devices have been provided for effectively directing a flow of fuel to a bake burner or to a broil burner of a single oven cooking cavity or chamber, depending upon the position of a selector knob of the control device, one embodiment of this invention provides an improved control system for such bake and broil burners wherein a pressure operated valve means is disposed in a conduit means leading from a control device to the bake and broil burners to be operated in such a manner that when the control device is set for a baking operation, the valve means will be in its closed position to prevent fuel flow to the broil burner so all fuel issuing into the conduit means from the control device will only be directed to the bake burner and when the selector means of the control device is set for a broiling operation, the valve means will be operated to its open position by the pressure of pilot fuel flow now being directed to the pilot burner for the broil burner so all of the flow of the fuel issuing into the conduit means from the control device can be directed to the broil burner.

Accordingly, it is an object of this invention to provide an improved fuel control system having one or more of the novel features set forth above or hereinafter shown or described.

Other objects, uses and advantages of this invention are apparent from a reading of this description, which proceeds with reference to the accompanying drawings forming a part thereof and wherein:

FIG. 8A is a view similar to 6A and illustrates the disc valve member set in the broiling position of FIG. 8.

FIG. 11 is a view similar to FIG. 2 and illustrates certain parts of the control system of FIG. 10.

Figure 1:
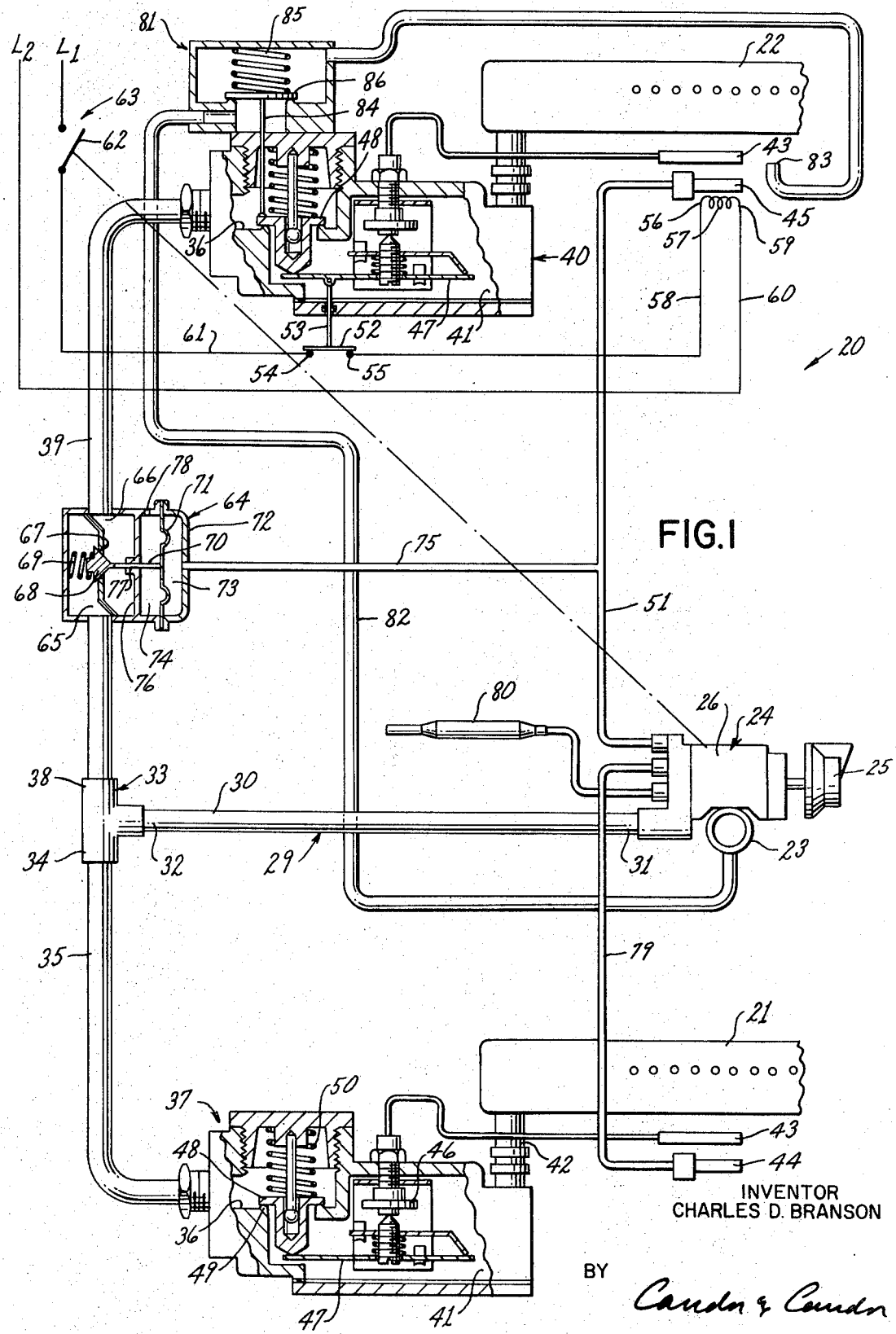
FIG. 1 is a schematic view illustrating the improved control system of this invention.

While the various features of this invention are hereinafter described and illustrated as being particularly adaptable to provide a control system for a double burner domestic oven or the like, it is to be understood that the various features of this invention can be utilized singly or in any combination thereof to provide means for operating other control systems or the like.

Therefore, this invention is not to be limited to only the embodiments illustrated in the drawings, because the same are merely utilized to illustrate some of the wide variety of uses of this invention.

Figure 2:
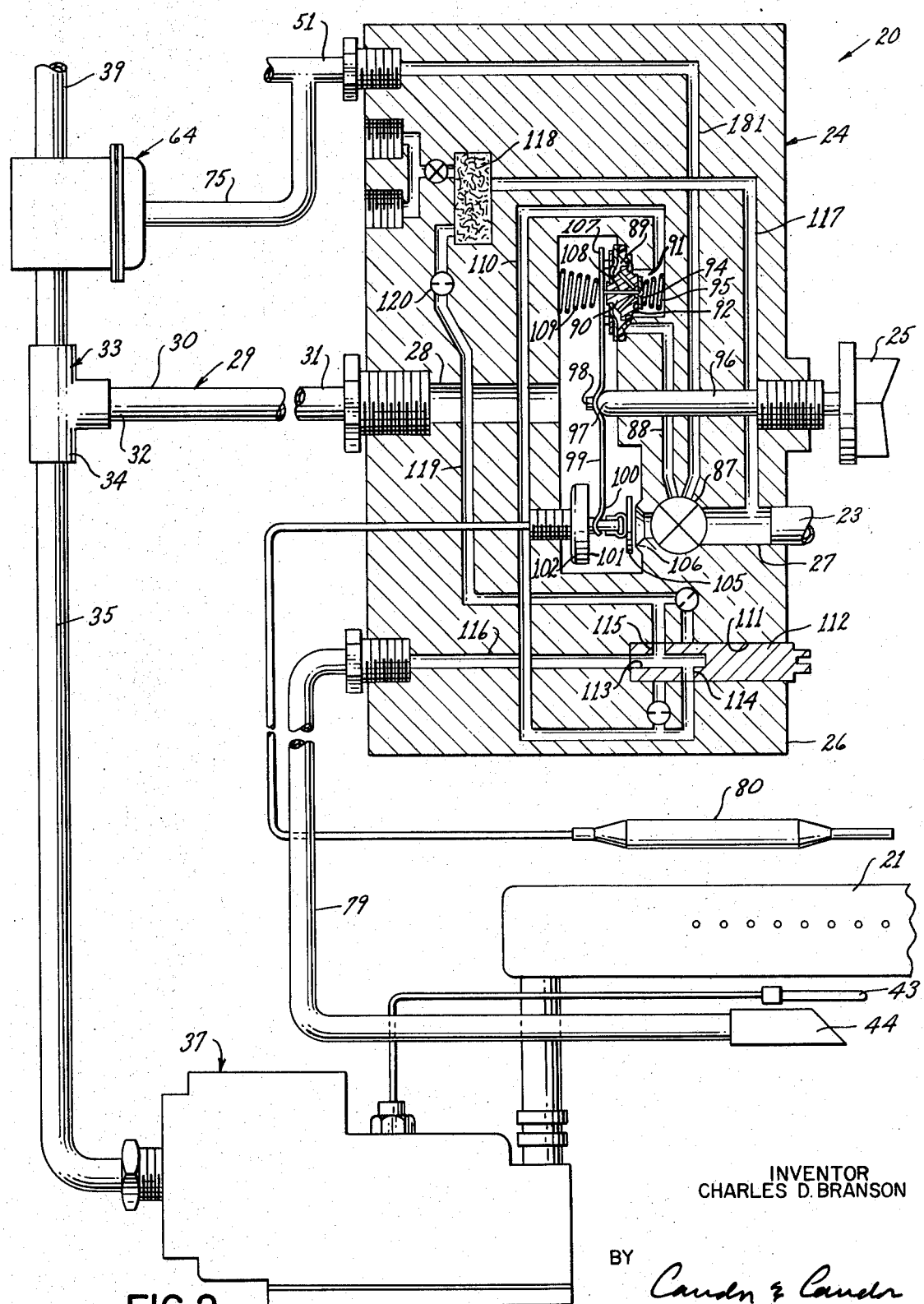
FIG. 2 is an enlarged schematic view of part of the control system illustrated in FIG. 1 and illustrates schematically the control device utilized with the system of FIG. 1.

Referring now to FIGS. 1 and 2, an improved control system of this invention is generally indicated by the reference numeral 20 and includes a bake burner 21 and a broil burner 22 adapted to be disposed in a domestic cooking apparatus or the like to effect the cooking operation of a single cooking cavity or chamber by having a source of fuel 23 selectively directed thereto by a control device 24 of this invention in a manner hereinafter described.

As illustrated in FIGS. 1 and 2, the control device 24 includes a housing 26 having an inlet means 27 adapted to be fluidly interconnected to the fuel supply manifold 23 in any suitable manner and has an outlet means 28 interconnected to a conduit means 29 leading to the bake burner 21 and broil burner 22.

In particular, the conduit means 29 includes a first conduit 30 having one end 31 fluidly interconnected to the outlet 28 of the control device 24 and the other end 32 interconnected to a T-connector 33, the T-connector 33 having one branch 34 thereof interconnected to a conduit 35 that leads to an inlet means 36 of a safety valve means 37 for the bake burner 21. The other branch 38 of the T-connector 33 is interconnected by a conduit 39 to the inlet 36 of another safety valve means 40 for the broil burner 22.

The safety valves 37 and 40 can be of the types disclosed respectively for the bake and broil burners in the United States patent to Willson, No. 3,236,448, wherein the safety valve means 37 prevents fluid communication between its inlet 36 and its outlet 41 that leads to the bake burner 21 through the conventional venturi and orifice connection 42 when a flame detector means 43 senses that a certain flame means does not exist at a bake pilot burner means 44 for the bake burner 21. Similarly, the safety valve means 40 prevents fluid communication between its inlet means 36 and its outlet means 41 when a flame detector means 43 thereof senses that a certain flame means does not exist at a broil pilot burner means 45 for the broil burner 22.

The bake pilot burner means 44 can be of the type disclosed in the United States patent to Riehl, No. 3,308,-871, wherein the same is adapted to be continuously supplied a small amount of fuel from the control device 24 to maintain a continuously burning small standby flame which is not sensed by the detector means 43. However, when the bake pilot burner means 44 is additionally supplied fuel by the control device 24 in the manner hereinafter described, the bake pilot burner means 44 creates a large heater flame that is detected by the detector means 43 to cause a power element 46 of the safety valve means 37 to expand downwardly in FIG. 1 and, through lever means 47, cause a valve member 48 of the safety valve means 37 to open away from its valve seat 49 in opposition to the force of the compression spring 50 so that the inlet means 36 and 41 of the safety valve means 37 remain interconnected as long as such heater flame exists at the bake pilot burner means 44 to fluidly interconnect the conduit 35 to the bake burner 21.

Similarly, the broil burner safety valve means 40 will have its lever means 47 open the valve member 48 when the detector means 43 thereof senses a flame at the broil pilot burner means 45, the broil pilot burner means 45 being adapted to receive fuel from the control device 24 through an interconnecting conduit means 51 in a manner hereinafter described. However, the safety valve means 40 for the bake burner 22 differs from the safety valve means 37 for the bake burner 21 by additionally having its lever means 47 carrying a switch member 52 on a tying means 53 which is adapted to electrically bridge a pair of contacts 54 and 55 when the safety valve means 40 is closed in a manner similar to the broil burner safety valve means of the aforementioned patent to Willson. However, when the safety valve means 40 is moved to its open position by the flame detector means 43 detecting a flame at the broil pilot burner means 45, the lever means 47 moves the switch member 52 away from bridging contact with the contacts 54 and 55.

The contact 55 is interconnected to one side 56 of an electrical ignition coil 57 for the broil pilot burner means 45 by a lead 58, the other side 59 of the ignition coil 57 being interconnected by a lead 60 to a power source lead $L_2$. The other contact 54 is interconnected by a lead 61 to a switch blade 62 of a normally opened electrical switch 63 controlled by the control device 24 in a manner hereinafter described, the switch blade 62 when closed interconnecting the lead 61 to the other power source lead $L_1$.

The conduit means 39 leading from the T-connector 33 to the safety valve means 40 for the broil burner 22 has a fluid pressure operated valve means 64 of this invention disposed therein with the valve means 64 having its inlet side 65 adapted to be interconnected to its outlet side 66 by a valve seat 67 that is opened and closed by a valve member 68 normally urged to its closed position by a compression spring 69.

The valve member 68 of the valve means 64 is interconnected by a post means 70 to a flexible diaphragm 71 cooperating with a housing means 72 of the housing 64 to define chambers 73 and 74 on each side of the diaphragm 71, the chamber 73 being fluidly interconnected by a conduit means 75 to the conduit means 51 that leads to the broil pilot burner means 45 for a purpose hereinafter described. The chamber 74 is separated from the outlet side 66 of the valve means 64 by a wall 76 having an opening 77 passing therethrough and sealingly receiving the post means 70 while permitting axial movement of the post means 70 relative to the wall 76. The chamber 74 is interconnected to the atmosphere by an opening 78 in the housing means 72 to prevent a dash pot effect in the movement of the diaphragm 71 relative to the housing means 72 as will be apparent hereinafter.

The general operation of the control system 20 illustrated in FIG. 1 now will be described.

When the selector means 25 of the control device 24 is disposed in its "off" position, the control device 24 prevents the source of fuel 23 from being interconnected to the conduit 30 of the conduit means 29 and also prevents any additional amount of fuel from being directed to the bake pilot burner means 44 through a conduit means 79 to create the previously described large heater flame at the bake pilot burner means 44 whereby the safety valve means 377 is in its closed position to prevent fluid communication between the inlet 36 and outlet 41 thereof even though the control device 24 is continuously supplying a small amount of fuel through the conduit means 79 to the bake pilot burner means 44 to produce a continuously burning small standby flame. Also, when the selector means 25 of the control device 24 is disposed in its "off" position, no fuel is directed by the control device 24 into the conduit means 51 leading to the broil pilot burner means 45 so that the detector 43 maintains the safety valve 40 in its closed position to prevent fuel flow between its inlet 36 and its outlet 41 leading to the broil burner 22.

Since no fuel is being directed by the control device 24 in its "off" position through the conduit 51, it can be seen that likewise no fuel pressure exists in the chamber 73 of the pressure operated valve means 64 whereby the compression spring 69 maintains the valve member 68 against the valve seat 67 to prevent fluid communication between its inlet 65 and its outlet 66.

When the selector means 25 of the control device 24 is moved to any "on" position for a baking operation in a manner hereinafter described, the control device 24 still does not supply any fuel into the conduit 51 leading to the broil pilot burner means 45 whereby the pressure operated valve means 64 remains in its closed position and also the safety valve means 40 remains in its closed position. However, since the temperature in the oven is below the baking temperature selected by the selector means 25, the control device 24, in a manner hereinafter described, supplies an additional amount of fuel through the conduit 79 to create the previously described large heater flame at the bake pilot burner means 44 to be detected by the detector means 43 which will open the safety valve means 37 to interconnect the inlet means 36 thereof with its outlet means 41 so that fuel can now flow through the conduit means 29 to the bake burner 21 and be ignited by the pilot burner means 44.

The control device 24 continuously supplies fuel to the bake burner 21 to heat the oven until a temperature sensing bulb 80 of the control device 24 determines that the temperature of the oven is at or above the temperature selected by the knob 25 whereby the control device 24, in a manner hereinafter described, will terminate the flow of the additional fuel through the conduit 79 leading to the bake pilot burner means 44 so that the heater flame at the bake pilot burner means 44 will no longer exist. Thus, the detector 43 will cause the safety valve means 37 to close to prevent fuel from being directed to the bake burner 21. However, when the temperature in the oven falls below the temperature selected by the knob 25, the bulb 80 will again cause the control means 24 to create the large heater flame at the bake pilot burner means 44 to open the safety valve means 37 in the manner previously described to permit fuel to again issue from the main burner 21 and be ignited by the bake pilot burner means 44.

Thus, it can be seen that in any baking operation selected by the selector means 25 of the control device 24, the bake burner means 21 will be cycled on and off by the control device 24 to tend to maintain the temperature effect in the oven at the temperature effect selected by the selector knob 25, such baking operation not effecting the operation of the broil burner 22 because the pressure operated valve means 64 is in its closed position.

When the housewife, or the like, desires to utilize the control system 20 for a broiling operation, the housewife sets the selector knob 25 in a "broil" position thereof in a manner hereinafter described whereby not only does the control device interconnect the fuel source 23 to the conduit 30 of the conduit means 29, but also the control device 24 interconnects the source of fuel 23 to the conduit 51 leading to the broil pilot burner means 45. With the control knob 25 of the control device 24 disposed in its "broil" position, the same closes the switch blade 62 to place the ignition coil 57 across the power source leads $L_1$ and $L_2$ since the safety valve 40 is in its closed position.

The ignition coil 57 is now energized by the power source leads $L_1$ and $L_2$ to ignite the fuel now issuing from the pilot burner means 45. With flames now existing at the pilot burner means 45, the detector 43 detects such flames and causes the safety valve 40 to open and, when opened, the contact bridging member 52 is moved away from the contacts 54 and 55 to terminate the operation of the ignition coil 57.

However, when fuel is directed by the selector means 24 into the conduit 51 leading to the broil pilot burner means 43, such fuel pressure is also created in the chamber 73 of the fluid pressure operated valve means 64 of this invention to move the diaphragm 71 in a direction to open the valve member 69 away from the valve seat 67 in opposition to the force of the compression spring 68 so as to interconnect the inlet means 65 with the outlet means 66 thereof whereby the fuel in the conduit means 30 is adapted to be interconnected to the broil burner 22 when the safety valve means 40 opens in the manner previously described.

Therefore, since the control device 24 continuously supplies fuel to the broil pilot burner means 45 as long as the control knob 25 is set in its broil position, the pressure operated valve means 64 remains in its open position and the safety valve means 40 remains in its open position to produce continuous flame broiling at the burner means 22 as the control device 24 will prevent a runaway condition of the broil burner 22 during the broiling operation in a manner hereinafter described.

The particular details of the control device 24 of this invention for effecting the above operation of the control system 20 will now be described.

The control device 24 includes a disc valve member 87, FIG. 2, interconnected to the selector means 25 so that when the selector means is moved to any "on" bake position thereof in a manner hereinafter described, the disc valve 87 not only interconnects the inlet 27 with the outlet 28, but also interconnects the inlet 27 with a passage means 88 leading to a chamber 89 defined by a valve seat member 90 carried by the housing 26. The chamber 89 is separated from a chamber 91 by a valve seat 92 on the valve seat member 90, the valve seat 92 being opened and closed by a valve member 94 urged to the closed position by a compression spring 95.

An axially movable fulcrum pin 96 is carried by the housing 26 in such a manner that the axial position of the fulcrum pin 96 relative to the housing 26 is controlled by the selector or control knob 25 in a manner hereinafter described. The fulcrum pin 96 has a rounded end 97 provided with a cylindrical projection 98 passing through a suitable aperture in a lever 99 whereby the lever 99 is fulcrumed on the end 97 of the fulcrum pin 96.

One end 100 of the lever 99 bears against a movable wall 101 of an expansible and contractible element 102 having a wall 103 fixed to the housing 26, the interior of the expansible and contractible element 102 being interconnected to the oven temperature sensing bulb 80 by a conduit 104. The movable wall 101 of the expansible and contractible element 102 carries a valve member 105 for opening and closing a valve seat 106 in a manner hereinafter described.

The other end 107 of the lever 99 is adapted to engage a plunger 108 carried by the valve seat member 90 and engaging the valve member 94, the end 107 of the lever 99 being urged in a clockwise direction in FIG. 2 by a compression spring 109. Thus, the opening and closing of the valve member 94 is controlled by the lever 99 in relation to the temperature sensed by the bulb 80 and the axial position of the fulcrum pin 96 in a manner hereinafter described.

The chamber 91 of the housing 26 is interconnected to a passage means 110 leading to a bore 111 in the housing 26, an adjusting key 112 being rotatably disposed in the bore 111 and having a longitudinal bore 113 interconnected to the exterior of the key 112 by transverse bores 114 and 115. The longitudinal bore 13 of the adjusting key 112 is disposed in comunication with a passage 116 leading to the conduit 79 interconnected to the brake pilot burner means 44.

Another passage 117 is formed in the housing 26 and is interconnected with the inlet passage 27 at a point upstream from the disc valve 87 as well as to a filter chamber 118. The filter chamber 118 is interconnected to a passage 119 leading to the bore 111 in the manner illustrated in FIG. 2, the passage 119 having an orifice therein.

Thus, it can be seen that when the adjusting key 112 is disposed in the "on" position, as illustrated in FIG. 2, fuel from the supply conduit 23 is adapted to pass through the passages 117 and 119 to the passage 115 of the adjusting key 112 and, thus, to the bake pilot burner means 44 to provide the previously mentioned small standby flame, which does not affect the safety valve means 37.

However, when the disc valve 87 is moved to an opened position for a making operation and the valve member 94 is moved to an opened position in a manner hereinafter described, the additional fuel being supplied through the passage 110 to the passage 114 of the adjusting key 112 causes the bake pilot burner means 44 to provide the previously described large heater flame which is sensed by the bulb 43 and causes the safety valve means 37 to open. However, when the valve member 94 closes, the additional supply of fuel to the pilot burner 44 is terminated whereby the larger heater flame ceases to exist, even though the standby flame continues, whereby the safety valve 37 will close.

Thus, as the valve member 94 cycles between its opened and closed positions in a manner hereinafter described, the safety valve means 37 is cycle on and off to maintain the temperature of the oven at a temperature selected by the control knob 25 in the manner previously described.

As illustrated in FIGS. 3, 4, 5 and 6A, the housing means 26 defines a flat valve surface 121, interrupted by the spaced inlet 27 and an outlet 122 adapted to be interconnected together by a groove 123 in the disc valve 87.

In particular, the groove 123 in the disc valve 87 interrupts a valve surface 124 thereof with the valve surface 124 being disposed in sealing and sliding contact with the valve seat surface 121 of the housing 26, the disc valve 87 having an opening 125 passing therethrough and loosely receiving the end 126 of the fulcrum pin 96.

Figure 5:
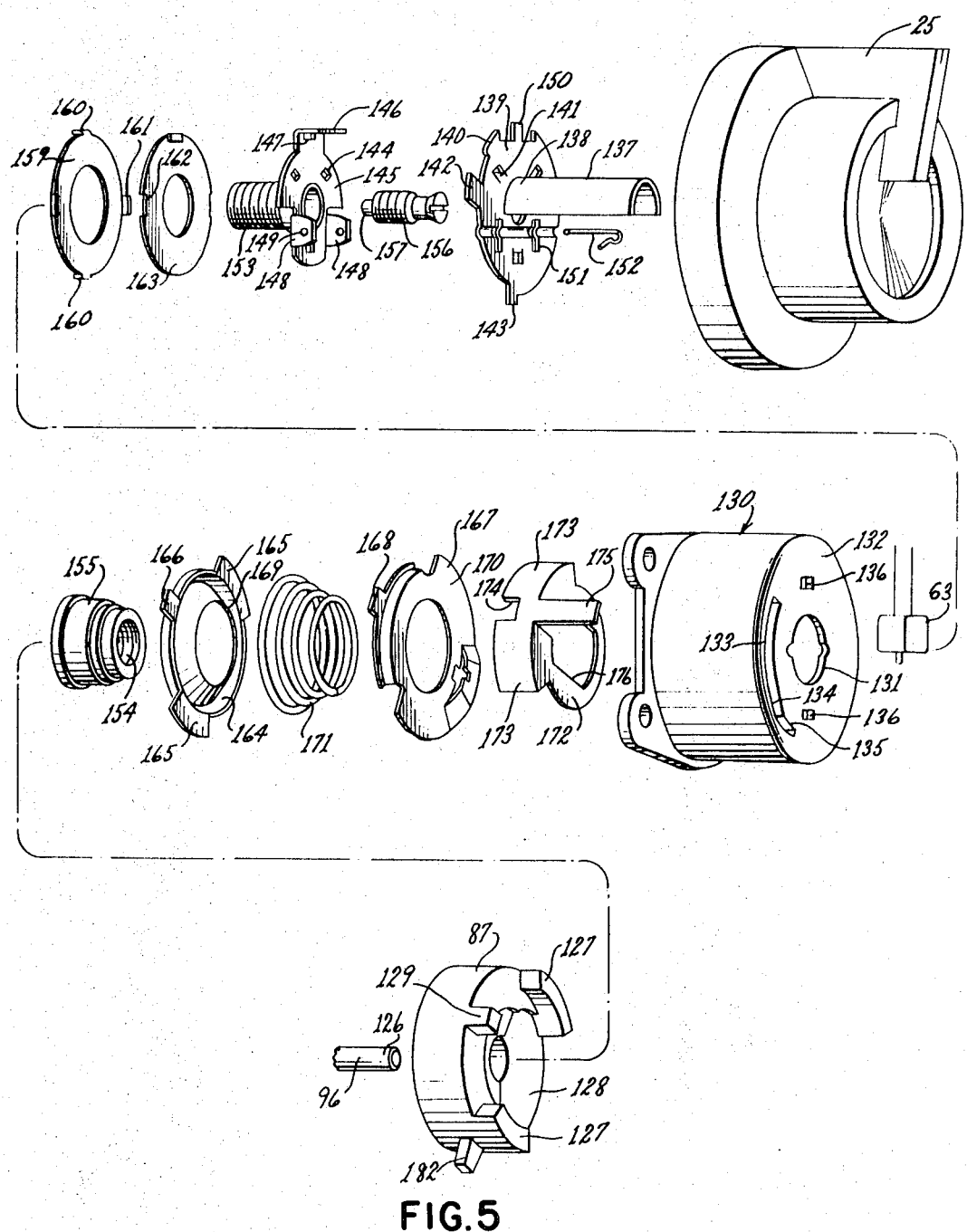
FIG. 5 is an exploded perspective view of various parts of the control device of FIGS. 3 and 4.

As illustrated in FIG. 5, the disc valve 87 has a pair of spaced arcuate embossments 127 formed on the side 128 thereof and a smaller substantially rectangular embossment 129 intermediate the embossments 127 for a purpose hereinafter described.

A cut-shaped member 130 forms part of the housing means 26 and is telescopically disposed over the disc valve 87, the member 130 having an aperture 131 passing therethrough in the closed end 132 thereof. The closed end 132 has a cam slot 133 formed therein and defining opposed camming edges 134 and 135 best illustrated in FIGS. 6 and 7. In addition, a pair of apertures 136 pass through the wall 132.

A C-shaped shaft 137 has one end 138 thereof interconnected to a plate member 139 having three outwardly projecting tangs 140, 143 and 142. In addition, rearwardly directed tangs 141 are formed in the plate member 139 and are adapted to register with apertures 144 formed on another plate member 145.

The plate member 145 has a bent over tang 146 provided with a slot 147 and a pair of ears 148 having apertures 149 passing therethrough. The members 139 and 145 are adapted to be assembled together with another tang 150 of the member 139 received in the slot 147 of the member 145 and with the ears 148 of the member 145 passing through slots 151 of the plate member 139 and pinned thereto by a pin means 152 passing through the apertures 149. In this manner, rotation of the shaft 137 by the control knob 25 causes like rotation of the plate member 145.

The plate member 145 carries a tubular extension 153 both internally and externally threaded, the tubular extension 153 adapted to be threadedly received in a threaded bore 154 of a member 155 fixed in the aperture 131 of the housing part 130.

An adjusting screw 156 is threaded in the tubular part 153 of the plate 145 and has an end 157 adapted to abut the end 126 of the fulcrum pin 96.

Thus, rotation of the control knob 25 fastened on the other end 158 of the C-shaped shaft 137 causes the member 153 to be threaded into or out of the fixed threaded member 155 to adjust the axial position of the fulcrum pin 96.

A bowed spring-like washer 159 is provided and has tangs 160 adapted to register in the apertures 136 of the housing part 130, the spring means 159 having reversely directed tangs 161 adapted to be received in notches 162 in a washer-like member 163, the spring member 159 and washer-like member 163 being disposed between the closed wall 132 of the housing part 130 and the plate member 145 to place an outward force on the plate-like member 145, and, thus, provide "feel" in adjusting the rotational position of the knob 25 relative to the housing 26.

A spring retainer 164 is provided and has outwardly directed tangs 165 adapted to rest on the embossments 127 of the disc valve 87 and another tang 166. Another spring retainer 167 is provided and has an outwardly directed tang 168 similar to tang 166 of the spring retainer 164, retainers 164 and 167 respectively having openings 169 and 170 passing therethrough so that the same can be telescoped on the fixed threaded memebr 155. A compression spring 171 is adapted to be disposed between the spring retainers 164 and 167 to compact a clutch member 172 against the inside surface of the wall 132 of the housing part 130.

The clutch part 172 has a pair of depending flanges 173 defining a notch 174 therebetween adapted to not only receive the tangs 168 and 166 of the spring retainers 167 and 164, but to also receive the rectangular embossment 129 of the disc valve 87. In addition, the clutch member 172 has an outwardly directed tang 175 adapted to pass through the cam slot 133 of the housing part 130, the clutch part or drive member 172 having an aperture 176 passing therethrough to loosely receive the fixed member 155.

The operation of the control device 24 is utilized in the system 20 of this invention, with the parts heretofore described, will now be described.

Assuming that the control knob 25 is disposed in its "off" position as illustrated in FIGS. 2, 6, 6A and 6B, the groove 123 of the disc valve 87 is in such a position that the same does not interconnect the inlet 27 with the outlet 122 nor the inlet 27 with the passage means 88 whereby no fuel issues from the bake burner 21 and only a small standby flame exists at the bake pilot burner means 44 as the adjusting key 112 is normally disposed in the "on" position as illustrated in FIG. 2.

Figure 7:
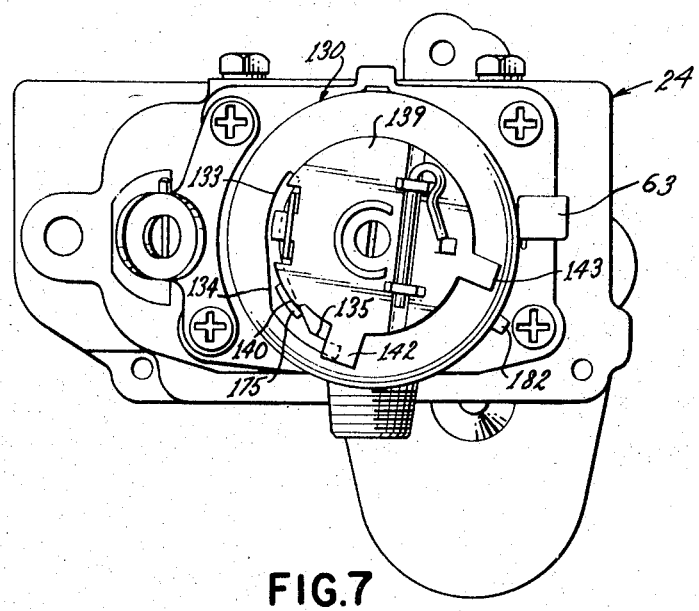
FIG. 7 is a view similar to FIG. 6 and illustrates the control device in a baking position thereof.

When the operator desires to turn on the oven for a set baking temperature thereof, the operator grasps the knob 25 and rotates the same in a counterclockwise direction as illustrated in FIG. 7 whereby rotation of the knob 25 causes like rotation of the plate 139 whereby the tang 140 of plate 139 bears against the tang 175 of the drive member 172 to cause like rotation therewith. As the drive member 172 is being rotated, the same, through the notch 174 thereof, rotates the spring retainers 167 and 164 as well as the disc valve 87 to bring the groove 123 of the disc valve 87 in such a position that the same fully interconnects the inlet 27 with the outlet 122, as well as to have a groove 177 of the valve member 87 interconnect a branch inlet port 178 of the housing 26 to the passage 88 as illustrated in FIG. 7A.

Figure 7A:
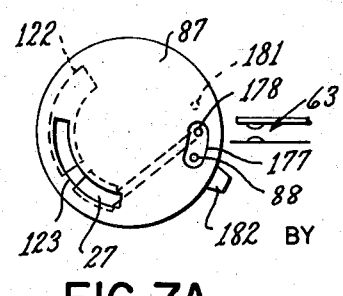
FIG. 7A is a view similar to FIG. 6A and illustrates the disc valve set in the baking position of FIG. 7.
Figure 7B:
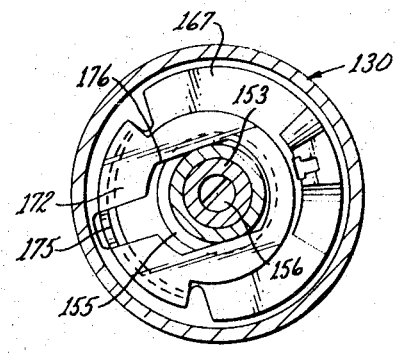
FIG. 7B is a view similar to FIG. 6B and illustrates the clutching members of the control device when set in the baking position of FIG. 7.
Figure 6B:
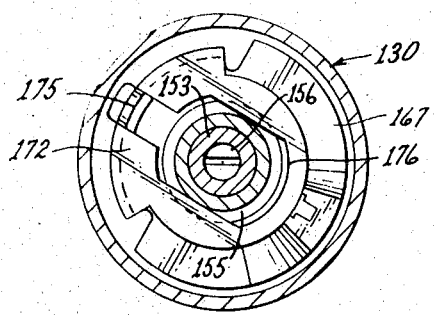
FIG. 6B is a cross-sectional view taken on line 6B–6B of FIG. 4 to illustrate the clutching member of the control device when the control device is set in its off position of FIG. 6.

However, when the disc valve 87 is rotated to its fully "on" position, it can be seen that the edge 135 of the cam slot 133 slides the drive member 172 radially outwardly to the position illustrated in FIGS. 7 and 7B whereby the tang 140 of the plate member 139 is no longer in engagement with the tang 175 of the drive member 172 so that the control knob 25, when further rotated in a counterclockwise direction for setting the desired baking temperature does not further rotate the disc valve 87 from its fully "on" position as illustrated in FIGS. 7, 7A and 7B. Thus, the sliding movement of the drive member 172 declutches the disc valve 87 from the control knob or manipulator means 25.

Figure 3:
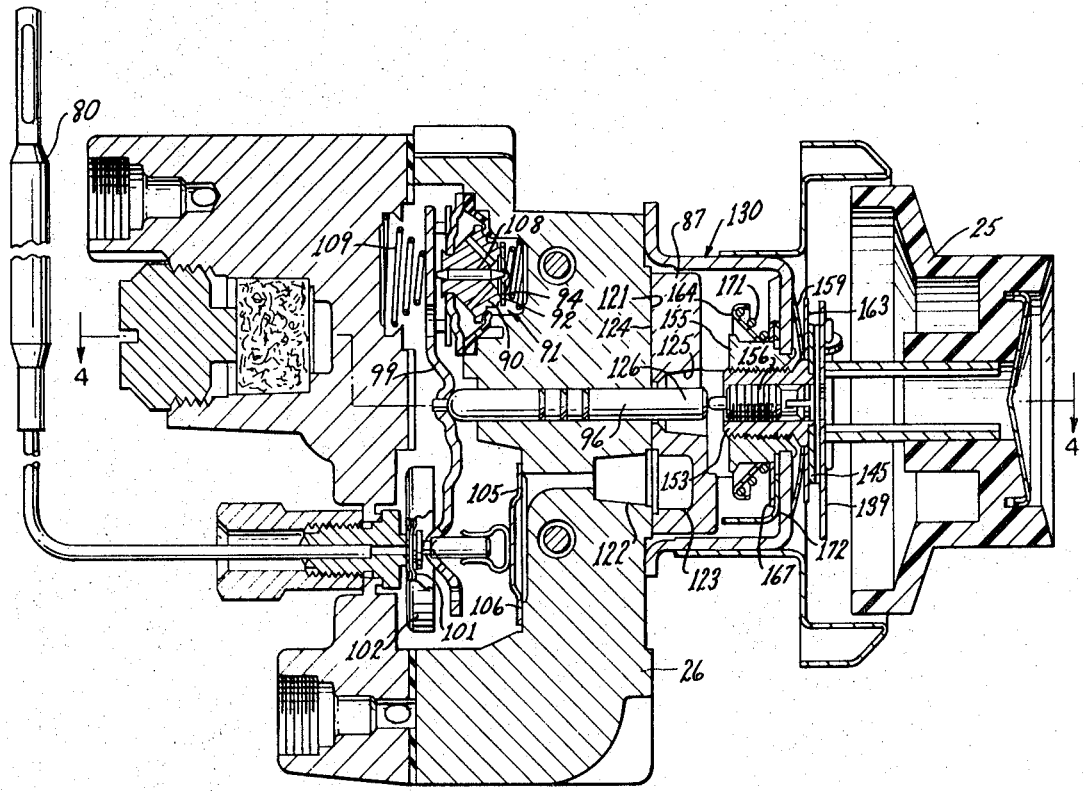
FIG. 3 is a cross-sectional view of the control device of the system of FIG. 1 and is taken on line 3—3 of FIG. 4.
Figure 4:
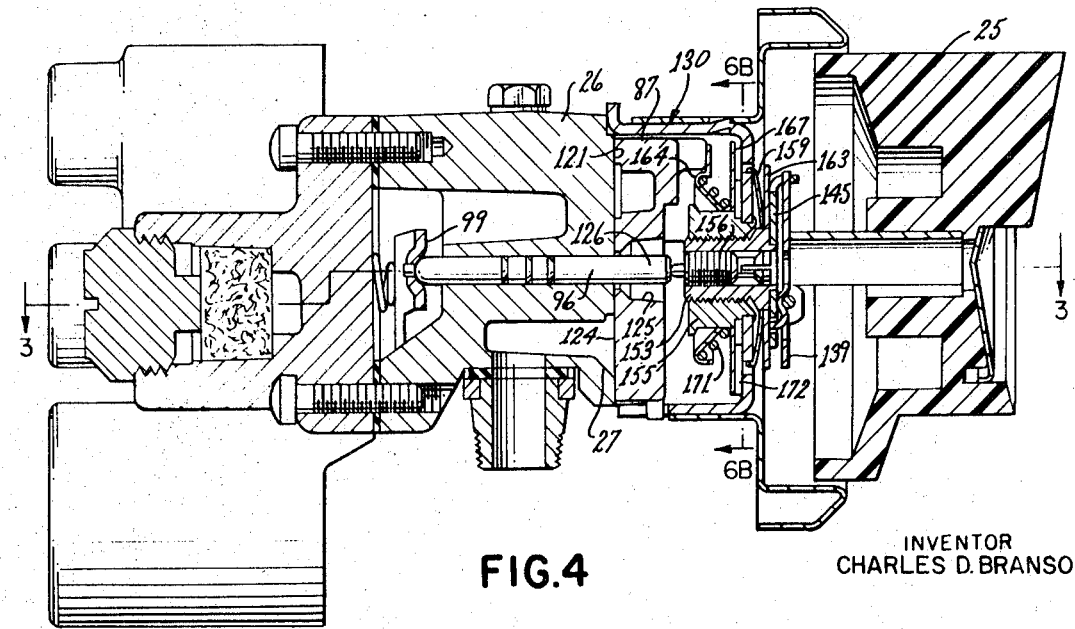
FIG. 4 is a cross-sectional view of the control device of FIG. 3 and is taken on line 4—4 thereof.

During the rotational movement of the control knob 25 from its position to a set baking temperature position thereof, the threaded member 153 of the plate 145 is backed out of the fixed threaded member 155 in such a manner that the fulcrum pin 96 is adjusted to a new position thereof to the right in FIGS. 2, 3 and 4 as selected by the temperature setting of the control knob 25.

This axial movement of the pin 96 from its "off" position to its selected baking temperature position permits the compression spring 109 to pivot the lever 99 on the fulcrum pin 96 in such a manner that the pin 108 carried by the valve seat member 90 is moved to the right in FIG. 2 to open the valve member 94 away from the valve seat 92 so that fuel in the passage 88 is now adapted to pass into the chamber 91 and, thus, to the bake pilot burner means 44 to create the large heater flame at the bake pilot burner means 44 whereby the bake burner 21 will be operated in the manner previously described.

Should a malfunction occur in the control device 24 of this invention, so that the valve member 94 will not close whereby the bake burner 21 remains on in a runaway condition, the increased temperature in the oven will cause the movable wall 101 of the power element 102 to further move to the right in FIG. 2 to bring the valve member 105 closer to the valve seat 106 to throttle the flow of fuel to the bake burner 21 in such a manner that the bake burner 21 cannot produce a temperature in the oven above a predetermined safe temperature. Such safety feature also applies for the broiling operation hereinafter described.

Figure 6:
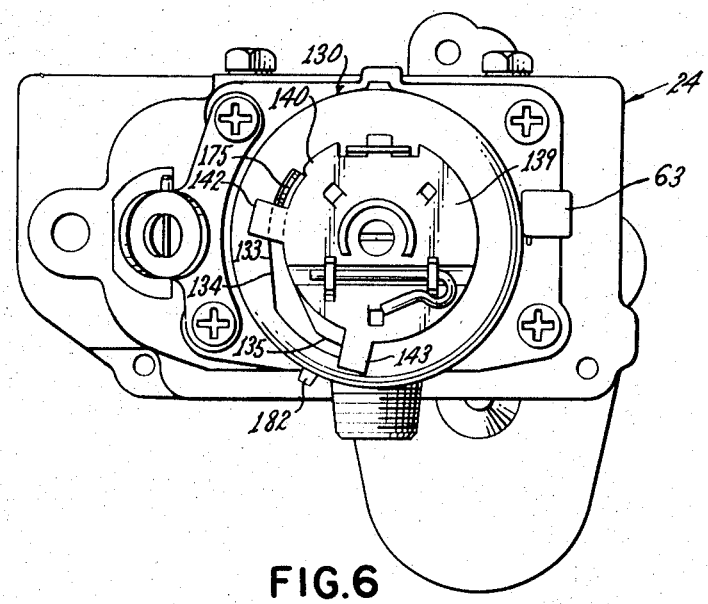
FIG. 6 is a front view of the control device of FIGS. 3 and 4 with the selector knob and cooperating means removed to illustrate the control device in its off position.

When it is desired to turn off the system 20 of this invention, the operator rotates the control knob 25 back to the "off" position illustrated in FIG. 6. As the plate 139 is being rotated to its "off" position, the tang 142 thereof engages the tang 175 of the drive member 172 and rotates the drive member 172 therewith, whereby the disc valve 87 is rotated back to its "off" position, the drive member 172 sliding radially inwardly relative to the disc valve 87 by means of the edge 134 of the cam slot 133 in the housing part 130 from the position illustrated in FIGS. 7 and 7A back to the position illustrated in FIGS. 6 and 6A. As the control knob 25 is rotated back to its "off" position, the tang 175 on the drive member 172 engages the end of the slot 133 when the control knob is disposed in its "off" position whereby the cam slot 133 determines the "off" position of the control knob 25.

Figure 8:
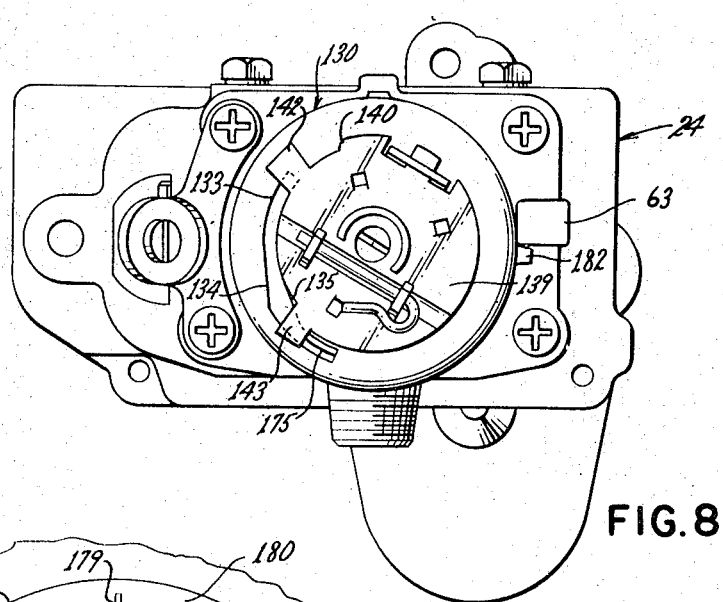
FIG. 8 is a view similar to FIG. 6 and illustrates the control device of FIGS. 3 and 4 set in its broiling position.
Figure 9:
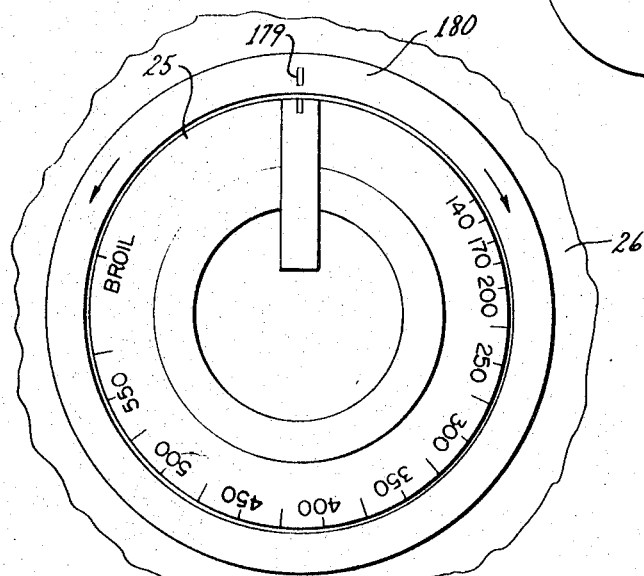
FIG. 9 is an enlarged front view of the selector knob means for the control device of FIGS. 3 and 4.

When it is desired to utilize the control system 20 of this invention for a broiling operation, the housewife or the like turns the selector means or control knob 25 in a counterclockwise direction in the manner previously described through the bake range until the control knob 25 as illustrated in FIG. 9 has the "broil" setting thereof placed adjacent the mark 179 on an outer stationary ring 180 of the housing means 26. As the control knob 25 is being slowly rotated and as the same approaches the "broil" setting thereof, it can be seen in FIGS. 8 and 8A that the tang 143 of the member 139 engages the tang 175 of the drive member 172 to rotate the same in a counterclockwise direction until the tang 175 engages the lower end of the cam slot 133 which is the "broil" position of the control knob 25. This further rotation of the drive member 172 causes further like rotation of the valve member 87 whereby the groove 177 of the valve member 87 now only interconnects the branch inlet port 178 of the housing 26 with a passage means 181 in the housing means 26 that leads to the conduit 51 for the broil pilot burner means 45.

The valve member 87 has an outwardly directed actuator 182 adapted to close the normally open switch means 63 when the valve member 87 has been moved to its "broil" position as illustrated in FIG. 8A whereby the closed switch means places the ignition coil 57 across the power source leads $L_1$ and $L_2$ for the purpose previously described. The broiling operation occurs in the manner previously described because the pressure operated valve means 64 is now under the control of the flow of fuel to broil pilot burner means 45 to direct the flow of fuel from the control device 24 to only the broil burner 22 to be operated in the manner previously described as the safety valve means 37 for the bake burner 21 is closed.

Since a normal broiling operation takes place at approximately 625° F. or the like, should the temperature sensing bulb 80 sense that the temperature in the oven is exceeding the aforementioned 625° F. or the like, the movable wall 101 of the power element 102 moves to the right in FIG. 2 to cause the valve member 105 to produce a throttling down or modulating action on the flow of fuel passing through the valve seat 106 so that the flames at the broil burner 22 will not go out and will not tend to exceed the aforementioned 625° F. temperature in the oven for the system 20.

Because there is a thermal time lag in the closing of the safety valve means 40 when the flame disappears at the broil pilot burner means 45, it has been found that an explosive condition could exist at the broil burner 22 should a person be operating the broil burner 22 and subsequently turn the control knob 25 to the "off" position thereof so that no fuel could pass to the broil burner 22 whereby the flames at the broil burner 22 and pilot burner 45 would terminate. Immediately thereafter the person could again turn the selector knob 25 back to the broil position thereof whereby fuel would again pass to the broil burner 22 through the again opened pressure operated valve means 64 and the still opened safety valve means 40 and such issuing fuel would not be ignited because the ignition means 57 is still inoperative by the still opened switch member 52.

However, a valve means 81 can be provided as an addition to the safety valve means 40 in the same manner as disclosed in the aforementioned patent to Willson, the valve means 81 being adapted to interconnect a conduit 82 that is directly connected to the fuel source manifold 23 to a standby pilot burner 83 as long as the valve member 48 of the safety valve means 40 is in its open position because the valve member 86 of the valve means 81 is interconnected to the valve member 48 of the safety valve means 40 by a rod means 84.

Thus, during the initial start up of a broiling operation in the manner previously described, the subsequent opening of the valve member 48 of the safety valve means 40 upon the detector 43 detecting the ignited pilot burner means 45, causes the valve member 86 of the valve means 81 to be opened in opposition to the force of a compression spring 85 so as to interconnect the fuel source conduit 23 to the standby pilot burner 83 to be ignited by the ignited pilot burner means 45. Thereafter, the standby pilot burner 83 has a continuously burning flame as long as the safety valve 40 remains in its open condition even if the selector knob 25 is subsequently turned to its "off" position and the safety valve means 40 has not closed because of a thermal lag therein.

Thus, if the person should again turn the selector knob 25 back to the "broil" position thereof while the valve member 48 of the safety valve means 40 is still in an open position thereof, the flame still issuing from the standby pilot burner 83 will ignite any fuel subsequently issuing from the broil burner 22 so that no explosive condition can exist in the oven should the control knob 25 be manipulated in the above manner.

In addition, the system 20 of this invention overcomes a particular disadvantage of prior known all gas systems where both burners become operating under conditions of loss of control during a baking operation, such as by a broken temperature sensing bulb means 80 or the like.

In particular, this invention overcomes the above disadvantage while still providing the single dial operation for the bake and broil temperature settings in a manner not provided by prior known systems.

For example, under conditions of loss of control during a baking operation, such as by a broken thermostat bulb 80, only the bake burner 21 of this invention will be operated as the rise in temperature in the oven will not cause operation of the broil burner 22 as in prior known systems wherein a thermally operated broil safety valve will open when the oven temperature reaches a temperature sufficient to cause the flame detector for the broil safety valve to open whereby for this prior known type of system, a separate main flow broil selector cock is normally required in addition to a selector cock for a baking operation.

However, in the control systems of this invention, when such a high temperature is reached to cause opening of the broil burner safety valve 40, the pressure operated valve means 64 of this invention is not affected by the high temperature and remains closed so that no fuel can reach the broil burner 22 at any time the selector knob 25 is set for a baking operation.

While the control system 20 of this invention has been previously described and illustrated as having an electrical ignition means for igniting the broil pilot burner means 45, it is to be understood that such a system can utilize a "dual-rate" broil pilot burner means in much the same manner that the bake pilot burner means 44 is a "dual-rate" pilot burner means.

Figure 10:
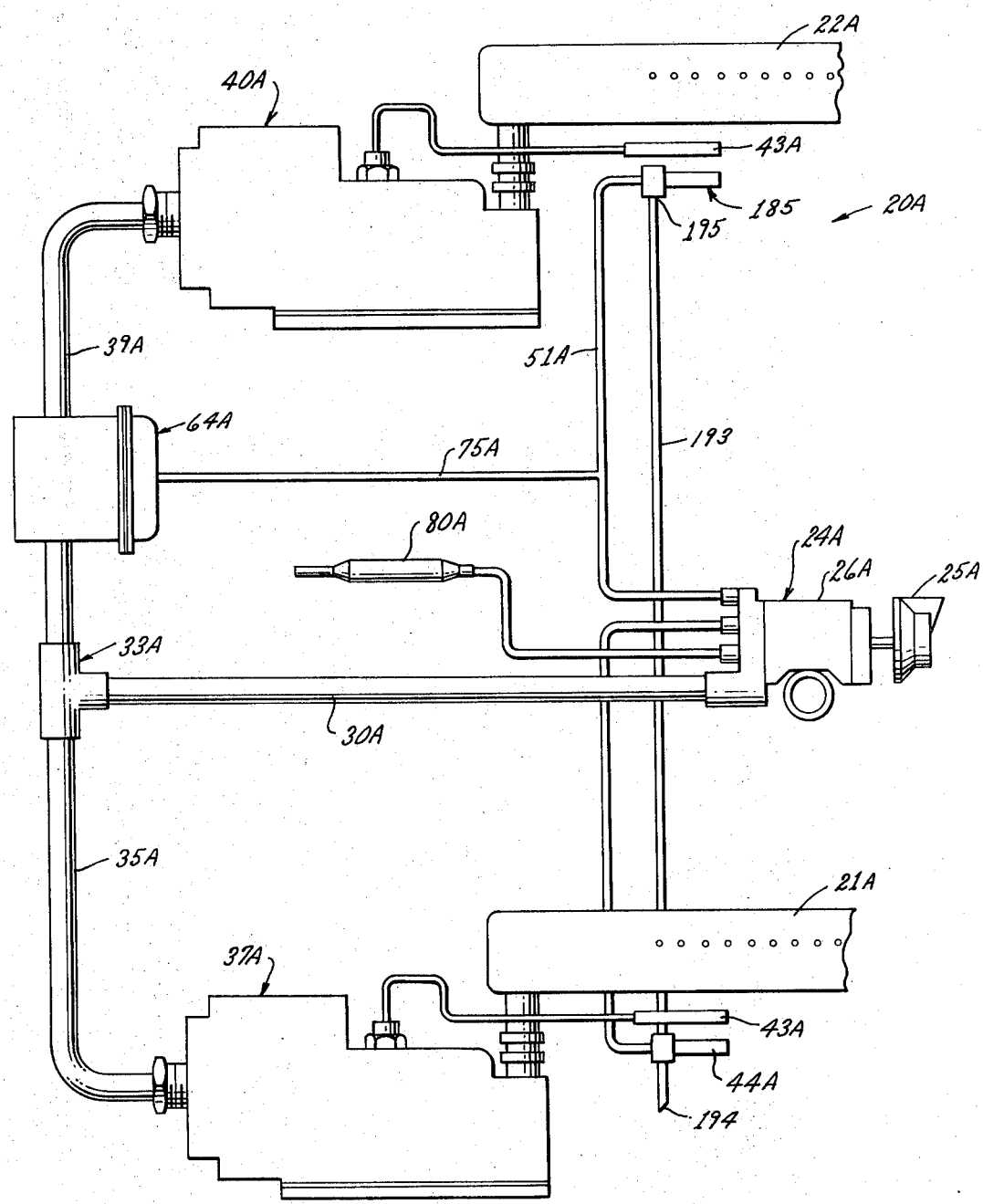
FIG. 10 is a schematic view of another control system of this invention.

In particular, reference is now made to FIGS. 10 and 11 wherein another control system of this invention is generally indicated by the reference numeral 20A and parts thereof similar to the system 20 previously described are indicated by like reference numerals followed by the reference letter A.

Since the basic difference between the control system 20A of FIGS. 10 and 11 and the control system 20 of FIGS. 1 and 2 is that the control system 20A utilizes a "dual-rate" broil pilot burner means to eliminate the electrical ignition means 57 of the system 20, only the details pertaining to such "dual-rate" broil pilot burner means need be described as the function and operation of the control system 20A is identical to the function and operation previously described for the control system 20.

As illustrated in FIGS. 10 and 11, a "dual-rate" broil pilot burner means 185 is disposed adjacent the broil burner 22A and is adapted to always have a small continuously burning standby flame that is not detected by the detector means 43A of the safety valve means 40A.

In particular, the broil pilot burner means 185 is best illustrated in FIG. 11 and comprises a tubular member 186 having an outlet end 187 and a flame shield means or deflector 188 carrying the safety valve detector 43A to sense a large heater flame 189 only when the control device 24A is set for a broiling operation. The inlet end 190 of the tubular member 186 is interconnected to the conduit 51A leading to the housing 26A of the control device 24A and being in fluid communication with the previously described passage means 181A that is interconnected to the inlet 27A when the valve member 87A is set in its "broil" position.

In addition, the passage 117A of the housing 26A which continuously supplies fuel to the bake pilot means 44A to create the continuously burning small standby flame that is not detected by the detector 43A of the safety valve means 37A is also interconnected to the broil pilot burner means 185 by a branch passage means 191 leading from the chamber 118A.

In this manner, a small amount of fuel is being continuously supplied to the pilot burner means 185 to continuously produce a small standby flame 192 at the outlet end 187 of the conduit 186 which is not detected by the detector 43A of the safety valve means 40A. Since only a small amount of fuel normally flows through the conduit 51A to produce the small standby flame 192 at the broil pilot burner means 185 when the control knob 25A is in the "off" position or in any "bake" position thereof, the small pressure of fuel also being received in the chamber 73A of the pressure operated valve means 64A is not sufficient to overcome the force of the spring 69A and open the valve member 68A whereby no fuel can flow from the broil burner 22A until the control knob 25A is set in its "broil" position.

However, it is well known that a continuously burning pilot in the top of an oven cavity is subjected to being snuffed out by the burning combustion products from a bake burner disposed in the lower part of the oven cavity.

Therefore, to overcome this adverse problem a snorkel tube 193 is provided, as illustrated in FIG. 10, having an inlet end 194 disposed well below the bake burner 21A and having its upper end 195 interconnected to an opening 196 in the side of the tube 186 between its inlet end 190 and its outlet end 187 to continuously supply a sufficient amount of air to the fuel passing through the tube 186 to maintain the small standby flame 192 even though the bake burner 21A may be operating.

Thus, the control system 20A of this invention operates in the same manner as the system 20 previously described for both the baking and broiling operations thereof except that during the baking operation the broil pilot burner means 20A has a continuously burning small standby flame 192 which will be increased in size to produce the large heater flame 189 only when the system 20A is utilized for a broiling operation.

In particular, when the control knob 25A of the control device 24A is set in its "broil" position, the valve member 87A will direct an additional amount of fuel through the conduit 51A leading to the broil pilot burner means 185 to cause a large heater flame 189 which will not only be detected by the detector 43A of the safety valve means 40A to direct fuel to the broil burner 22A in the manner previously described, but also the large heater flame 189 will ignite the fuel issuing from the broil burner 22A for a broiling operation thereof, the increased pressure of the fuel now being directed into the conduit 51A by the passage 181A causing the pressure operated valve 64A to open in the manner previously described.

Therefore, it can be seen that the control system 20A of this invention does not require an electrical control system for ignition of the broil burner means 22A as is required for the broil burner 22 of the control system 20 previously described.

If desired, the previously described control system 20A can utilize another type of broil pilot burner means for the broil burner instead of the dual rate snorkel pilot means 185 and can utilize a non-electrical ignition means therefor.

Figure 12:
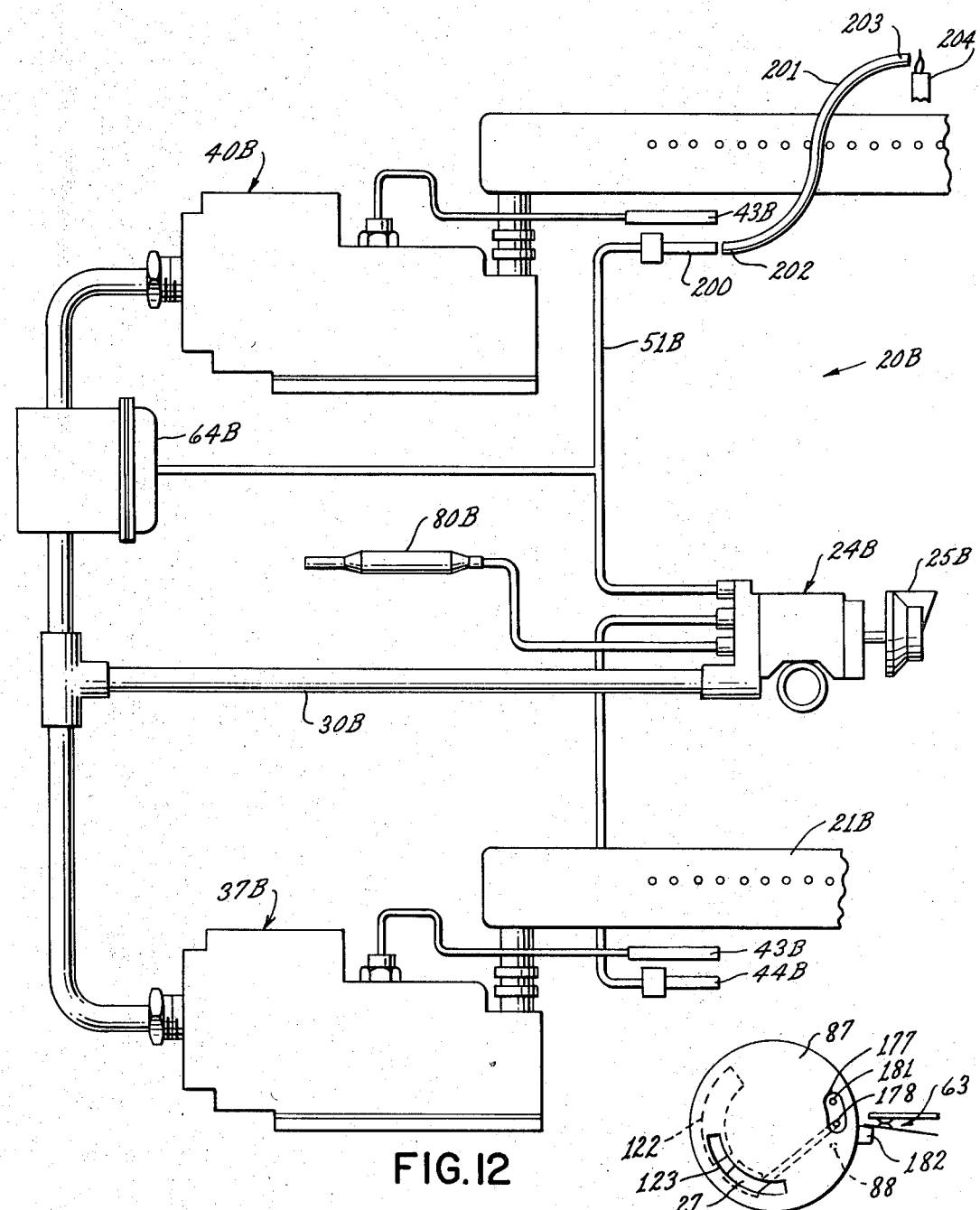
FIG. 12 is a schematic view of another control system of this invention.
Figure 6A:
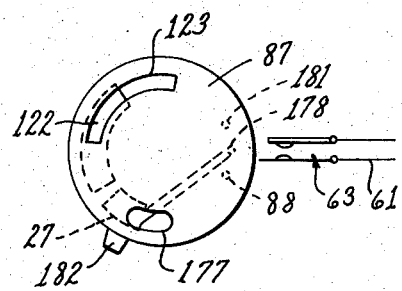
FIG. 6A is a schematic view illustrating the disc valve member of the control device of FIGS. 3 and 4 when disposed in the off position of FIG. 6.

For example, reference is now made to FIG. 12 wherein another control system of this invention is generally indicated by the reference numeral 20B and parts thereof similar to the system 20A and 20 previously described are indicated by like reference numerals followed by the reference letter B.

As illustrated in FIG. 12, a broil pilot burner means 200 is fluidly interconnected to the conduit 51B leading from the control device 24B to receive fuel when the selector means 25B is set in its broil position in the same manner as in the system 20 previously described.

However, in order to provide ignition means for the pilot burner means 200, a flash tube 201 is provided and has one end 202 adjacent the broil pilot burner means 200 and the other end 203 disposed adjacent a continuously burning pilot burner means 204 for the range top burners of the apparatus containing the system 20B. In this manner, when the selector means 25B of the control device 24B is set in its broil position, fuel is directed to the broil pilot burner means 200 through the conduit 51B and is ignited by the gas passing into the flash tube 201 at the end 202 thereof, being ignited by the standing pilot 204 at the end 203 and flashing back to the broil pilot burner means 200 in a manner well known in the art.

Figure 13:
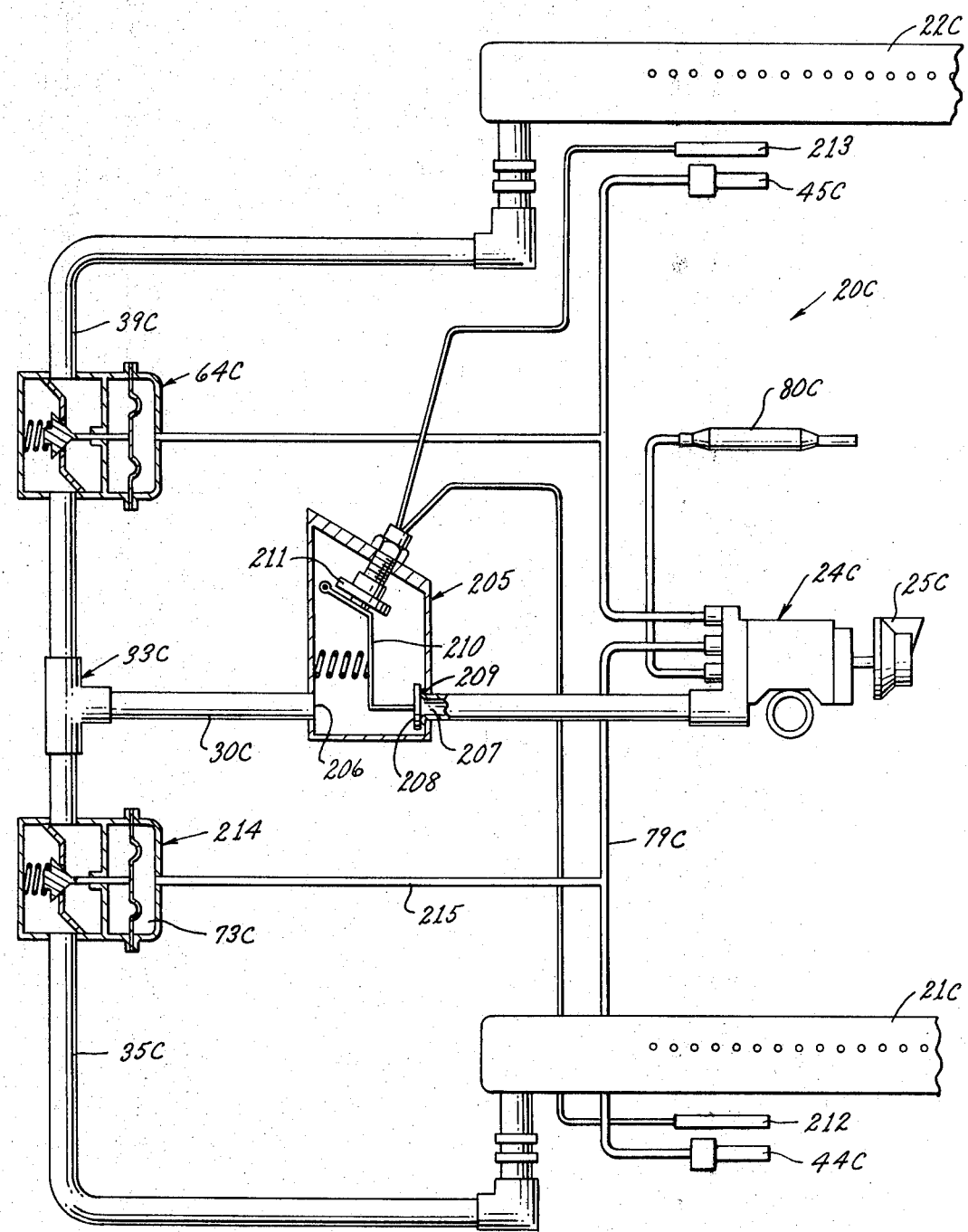
FIG. 13 is a schematic view of still another control system of this invention.

Another control system of this invention is generally indicated by the reference numeral 20C in FIG. 13 and parts thereof similar to the system 20 previously described are indicated by like reference numerals followed by the reference letter C.

As illustrated in FIG. 13, a safety valve means 205 is disposed in the conduit 30C in advance of the T-connector 33C and is adapted to have its inlet 206 interconnected to its outlet 207 when a valve member 208 thereof is moved away from the valve seat 209 by lever means 210 controlled by a power element 211 that has two separate flame detectors 212 and 213 for respectively operating the power element 211 and for respectively sensing certain flame means at the pilot burner means 44C and 45C of the bake burner means 21C and broil burner means 22C.

In this manner, the valve member 208 will be moved away from the valve seat 209 to interconnect the conduit 30C to the T-connector 33C if the detector 212 senses a heater flame at the bake pilot burner means 44C or if the detector 213 senses a flame at the broil pilot burner means 45C.

In this manner, no separate safety valve means similar to the safety valve means 37 and 40 of the control system 20 previously described are utilized in the control system 20C as the single safety valve means 205 provides a like function.

The control system 20C includes the pressure operated valve means 64C disposed in the conduit 39C to function in the same manner as the pressure operated valve means 64 of FIG. 1 previously described.

In addition, another pressure operated safety valve means 214 of this invention is disposed in the conduit means 35C leading to the bake burner means 21C and is constructed and arranged in the same manner as the pressure operated valve means 64C except that the pressure chamber 73C is interconnected by a conduit 215 to the pilot burner passage means 79C that leads to the dual rate pilot burner means 44C for the bake burner 21C, the pressure operated valve means 214 remaining in its closed position when the flow of fuel through the passage means 79C is only sufficient to produce a small standby flame at the pilot burner means 44C. However, when the control knob 25C is set in any "bake" position thereof, the increased flow of fuel through the conduit 79C opens the pressure operated valve means 214 to permit fuel to flow to the bake burner means 21C in the same manner as previously described for the pressure operated valve means 64A of FIG. 10 for the broil burner 22A thereof. Thus, it can be seen that the pressure operated valve means 64C and 214 are selectively operated by the flow of pilot burner fuel to associated pilot burners under the control of the control device 24C.

While the system 20C has been illustrated with ignition means for the broil pilot burner means 45C being the same as provided in the system 20 of FIG. 1, it is to be understood that other types of ignition means can be provided for the broil pilot burner means 44C in the same manner as is provided in the systems 20A and 20B previously described.

Therefore, it can be seen that this invention provides an improved fuel control system for a double burner oven arrangement or the like as well as an improved fuel control system for other types of apparatus as desired.

What is claimed is:

1. In combination, a source of fuel, a main burner means having first passage means leading thereto, a pilot burner means for said main burner means and having second passage means leading thereto, a control device having selector means for interconnecting said source of fuel to said first and second passage means when said selector means of said control device is set in a first operating position thereof, said control device interconnecting said source of fuel to only said first passage means when said selector means thereof is set in a second operating position thereof and disconnecting said source of fuel from both said passage means when said selector means is set in a third operating position thereof, and a fluid pressure operated valve means disposed in said first passage means intermediate said control device and said main burner means to prevent flow through said first passage means when said valve means is closed and to permit flow through said first passage means when opened, said valve means being interconnected to said second passage means to be operated to its open position by the pressure of fuel flow through said second passage means.

2. In combination, a source of fuel, a main burner means having first passage means leading thereto a pilot burner means for said main burner means and having second passage means leading thereto, a control device for interconnecting said source of fuel to said first and second passage means when said control device is set in one operating position thereof, a fluid pressure operated valve means disposed in said first passage means intermediate said control device and said main burner means to prevent flow through said first passage means when said valve means is closed and to permit flow through said first passage means when opened, said valve means being interconnected to said second passage means to be operated to its open position by the pressure of fuel flow through said second passage means, and a safety valve means disposed in said first passage means and having means for sensing certain flame means at said pilot burner means, said safety valve means opening to permit fuel flow through said first passage means when sensing said certain flame means at said pilot burner means.

3. A combination as set forth in claim 2 wherein said safety valve means is disposed intermediate said pressure operated valve means and said main burner means.

4. A combination as set forth in claim 2 wherein said safety valve means is disposed intermediate said control device and said pressure operated valve means.

5. In combination, a source of fuel, a main burner means having first passage means leading thereto, a pilot burner means for said main burner means and having second passage means leading thereto, a control device for interconnecting said source of fuel to said first and second passage means when said control device is set in one operating position thereof, and a fluid pressure operated valve means disposed in said first passage means intermediate said control device and said main burner means to prevent flow through said first passage means when said valve means is closed and to permit flow through said first passage means when opened, said valve means being interconnected to said second passage means to be operated to its open position by the pressure of fuel flow through said second passage means, said control device thermostatically controlling the flow of fuel into said second passage means.

6. In combination, a source of fuel, a main broil burner, a pilot burner for said broil burner, a main bake burner, a pilot burner for said bake burner, a control device, first passage defining means leading from said control device to said bake and broil burners, second and third pilot burner passage defining means respectively leading from said control device to said pilot burners, said control device being adapted to interconnect said source of fuel to said first and second passage means when set in one position thereof and being adapted to interconnect said source of fuel to said first and third passage means when set in another position thereof, and a fluid pressure operated valve means disposed in said first passage means intermediate said control device and one of said main burners to prevent fuel flow to said one main burner when said valve means is closed and to permit fuel flow to said one main burner when opened, said valve means being interconnected to the pilot burner passage means for the pilot burner of said one main burner to be operated to its open position by the pressure of fuel flow through that particular pilot burner passage means.

7. A combination as set forth in claim 6 wherein a safety valve means is disposed in said first passage means and has means for sensing certain flame means at the pilot burner of said one main burner, said safety valve means opening to permit fuel flow through said first passage means to said one main burner when sensing said certain flame means at the pilot burner of said one main burner.

8. A combination as set forth in claim 7 wherein said safety valve means is disposed intermediate said control device and said pressure operated valve means.

9. A combination as set forth in claim 7 wherein said safety valve means is disposed intermediate said pressure operated valve means and said one main burner.

10. A combination as set forth in claim 6 wherein a pair of safety valve means are disposed in said first passage means and have means for respectively sensing certain flame means at said pilot burners, said safety valve means respectively controlling the flow of fuel in said first passage means to said main burners so that the respective safety valve means will only open to permit fuel to flow to its respective main burner when its respective pilot burner has its said certain flame means.

11. A combination as set forth in claim 10 wherein said safety valve means for said one main burner is disposed intermediate said pressure operated valve means and said one main burner.

12. A combination as set forth in claim 11 wherein said one main burner is said broil burner.

13. A combination as set forth in claim 6 wherein another pressure operated valve means is disposed in said first passage means intermediate said control device and the other main burner to permit fuel flow to said other main burner when opened, said other valve means being interconnected to the pilot burner passage means for the pilot burner of said other main burner to be operated to its open position by the pressure of fuel flow through that particular pilot burner passage means.

14. A combination as set forth in claim 13 wherein a safety valve means is disposed in said first passage means and has means for respectively sensing certain flame means at said pilot burners, said safety valve opening to permit fuel flow through said first passage means to said pressure operated valve means when sensing said certain flame means at either pilot burner.

15. In a fuel control system for an apparatus having a plurality of main burners and pilot burners therefor, the improvement comprising a fluid pressure operated valve means for controlling the flow of fuel to one of said main burners, said pressure operated valve means being operatively interconnected to the pilot burner for said one main burner to be operated to the open position thereof by the pressure of the fuel flow to that particular pilot burner, another fluid pressure operated valve means for controlling the flow of fuel to another of said main burners, said other pressure operated valve means being operatively interconnected to the pilot burner for said other main burner to be operated to the open position thereof by the pressure of the flow of fuel to that particular pilot burner, and a safety valve means for controlling the flow of fuel to said pressure operated valve means, said safety valve means having means for sensing certain flame means at said pilot burners so that said sensing means causes said safety valve means to open when sensing said certain flame means at any of said pilot burners.

16. In a fuel control system for an apparatus having a plurality of main burners and pilot burners therefor, the improvement comprising a fluid pressure operated valve means for controlling the flow of fuel to one of said main burners, said pressure operated valve means being operatively interconnected to the pilot burner for said one main burner to be operated to the open position thereof by the pressure of the fuel flow to that particular pilot burner, and a safety valve means for controlling the flow of fuel to said one main burner and having means for sensing certain flame means at the pilot burner for said one main burner, said sensing means only opening said safety valve means when sensing said certain flame means.

17. In a fuel control system for an apparatus having a main burner means and a pilot burner means therefor, the improvement comprising a fluid pressure operated valve means for controlling the flow of fuel to said main burners, said pressure operated valve means being operatively interconnected to said pilot burner means to be operated to the open position thereof by the pressure of the fluel flow to that pilot burner means, and a safety valve means for controlling the flow of fuel to said main burner means and having means for sensing certain flame means at said pilot burner means, said sensing means opening said safety valve means when sensing said certain flame means.

References Cited

UNITED STATES PATENTS 2,032,046  2/1936  Branche _____ 431—58
2,746,534  5/1956  Brooks et al. _____ 431—89X CARROLL B. DORITY, JR., Primary Examiner U.S. Cl. X.R.
431—90; 251—46